United States Patent
Doi et al.

(10) Patent No.: US 8,838,762 B2
(45) Date of Patent: Sep. 16, 2014

(54) VIRTUAL-MACHINE MANAGEMENT PROGRAM AND METHOD FOR MANAGING VIRTUAL MACHINES

(75) Inventors: Tsunehisa Doi, Kawasaki (JP); Shingo Tanino, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 578 days.

(21) Appl. No.: 12/820,592

(22) Filed: Jun. 22, 2010

(65) Prior Publication Data

US 2010/0332637 A1 Dec. 30, 2010

(30) Foreign Application Priority Data

Jun. 30, 2009 (JP) ................................. 2009-154901

(51) Int. Cl.
*G06F 15/173* (2006.01)
*H04L 12/26* (2006.01)
*G06F 9/455* (2006.01)
*H04L 12/24* (2006.01)
*H04L 29/08* (2006.01)

(52) U.S. Cl.
CPC .. *G06F 9/45558* (2013.01); *G06F 2009/45562* (2013.01); *H04L 43/00* (2013.01); *H04L 12/2425* (2013.01); *H04L 67/14* (2013.01); *H04L 29/08576* (2013.01); *G06F 9/45533* (2013.01)
USPC ........... 709/223; 709/203; 709/220; 709/227; 709/248

(58) Field of Classification Search
USPC .................................. 709/223, 221, 227, 248
See application file for complete search history.

(56) References Cited

U.S. PATENT DOCUMENTS

| | | | | | |
|---|---|---|---|---|---|
| 6,138,143 | A | * | 10/2000 | Gigliotti et al. | 709/203 |
| 7,146,414 | B1 | * | 12/2006 | Sievert et al. | 709/223 |
| 7,225,237 | B1 | * | 5/2007 | Tenereillo | 709/219 |
| 7,523,196 | B2 | * | 4/2009 | Dostert et al. | 709/224 |
| 7,590,710 | B1 | * | 9/2009 | Kokal et al. | 709/219 |
| 7,844,713 | B2 | * | 11/2010 | Ikawa et al. | 709/227 |
| 7,877,485 | B2 | * | 1/2011 | Piper et al. | 709/227 |
| 8,046,473 | B2 | * | 10/2011 | Piper et al. | 709/227 |
| 8,412,832 | B2 | * | 4/2013 | Narayana et al. | 709/227 |
| 2001/0047406 | A1 | * | 11/2001 | Araujo et al. | 709/223 |
| 2007/0050446 | A1 | * | 3/2007 | Moore | 709/203 |
| 2007/0124447 | A1 | * | 5/2007 | Ajitomi et al. | 709/223 |
| 2008/0288622 | A1 | * | 11/2008 | Gordon et al. | 709/223 |
| 2008/0295095 | A1 | | 11/2008 | Watanabe et al. | |
| 2009/0292812 | A1 | * | 11/2009 | Ishida et al. | 709/226 |
| 2009/0313486 | A1 | * | 12/2009 | Tani | 713/300 |
| 2010/0262650 | A1 | * | 10/2010 | Chauhan et al. | 709/203 |
| 2011/0314470 | A1 | * | 12/2011 | Elyashev et al. | 718/1 |

FOREIGN PATENT DOCUMENTS

| | | |
|---|---|---|
| JP | 2008-293117 | 12/2008 |
| JP | 2009-26117 | 2/2009 |

* cited by examiner

*Primary Examiner* — Michael Y Won
(74) *Attorney, Agent, or Firm* — Staas & Halsey LLP

(57) ABSTRACT

A method for managing virtual machines, the method causing a management server having a database includes link relation information and connected to a plurality of physical servers, on which virtual machine hosts are installed, the method includes updating the link relation information in such a manner that a link between a virtual machine host and a first virtual machine guest is disconnected, when information regarding the first virtual machine guest cannot be acquired from the virtual machine host and updating the link relation information stored in such a manner that a link between a virtual machine host and a second virtual machine guest, when information regarding the second virtual machine guest is acquired from the virtual machine host.

6 Claims, 19 Drawing Sheets

| VM GUEST NAME | KEY | UNIVERSALLY UNIQUE IDENTIFIER | LINK DISCONNECTION TIME | POWER OFF DETECTION TIME | POWER-SUPPLY STATE | MANAGEMENT VM HOST |
|---|---|---|---|---|---|---|
| Guest1 | 3 | 12345678-0000-0000-0001-0123456789ab | nil | 1202377222 | OFF | 1 |
| Guest2 | 4 | 12345678-0000-0000-0002-0123456789ab | nil | nil | ON | 2 |
| Guest3 | 5 | 12345678-0000-0000-0003-0123456789ab | 1202377192 | nil | ON | nil |
| ... | ... | ... | ... | ... | ... | ... |

60B

(12) United States Patent
US 8,838,762 B2

VIRTUAL-MACHINE MANAGEMENT PROGRAM AND METHOD FOR MANAGING VIRTUAL MACHINES

CROSS-REFERENCE TO RELATED APPLICATIONS

This application is based upon and claims the benefit of priority of the prior Japanese Patent Application No. 2009-154901, filed on Jun. 30, 2009, the entire contents of which are incorporated herein by reference.

FIELD

The various embodiments described herein relate to technologies for managing virtual machines.

BACKGROUND

Recently, a virtual technique in which a plurality of virtual machines are installed on a physical server and that makes each of the virtual machines run an arbitrary operating system (OS) and arbitrary applications has come into practical use. In a virtual machine environment, for example, when a physical server is maintained, a virtual machine running on the physical server can be migrated to another server and provide a service from the physical server to which the virtual server has been migrated (for example, see Japanese Unexamined Patent Application Publication No. 2009-26117).

Here, an operator who migrated the virtual machine recognizes to which server and from which server the virtual machine has been migrated. However, other operators cannot determine whether the virtual machine on the physical server, from which the virtual machine was migrated, disappears as a result of migration or deletion of the virtual machine unless they investigate specifically the operation statuses of virtual machines on physical servers.

SUMMARY

A method for managing virtual machines, the method causing a management server having a database to execute virtual machine management that makes it possible to specify virtual machine guests managed on a virtual-machine-host by virtual-machine-host basis, the management server being connected to a plurality of physical servers, on which virtual machine hosts are installed, link relation information regarding the virtual machine hosts and virtual machine guests being registered in the database, the method includes: updating the link relation information stored in the database in such a manner that a virtual machine host and a first virtual machine guest, which is linked to the virtual machine host in the database, have a link relation in which a link between the virtual machine host and the first virtual machine guest is disconnected, when information regarding the first virtual machine guest cannot be acquired from the virtual machine host; and updating the link relation information stored in the database in such a manner that a virtual machine host and a second virtual machine guest, which is linked to another virtual machine host different from the virtual machine host in the database, have a link relation in which there is a link between the virtual machine host and the second virtual machine guest, when information regarding the second virtual machine guest is acquired from the virtual machine host.

The object and advantages of the various embodiments will be realized and attained by means of the elements and combinations particularly pointed out in the claims.

It is to be understood that both the foregoing general description and the following detailed description are exemplary and explanatory and are not restrictive of the various embodiments, as claimed.

DESCRIPTION OF EMBODIMENTS

The following specifically describes technologies proposed herein with reference to the attached drawings.

Figure 1:
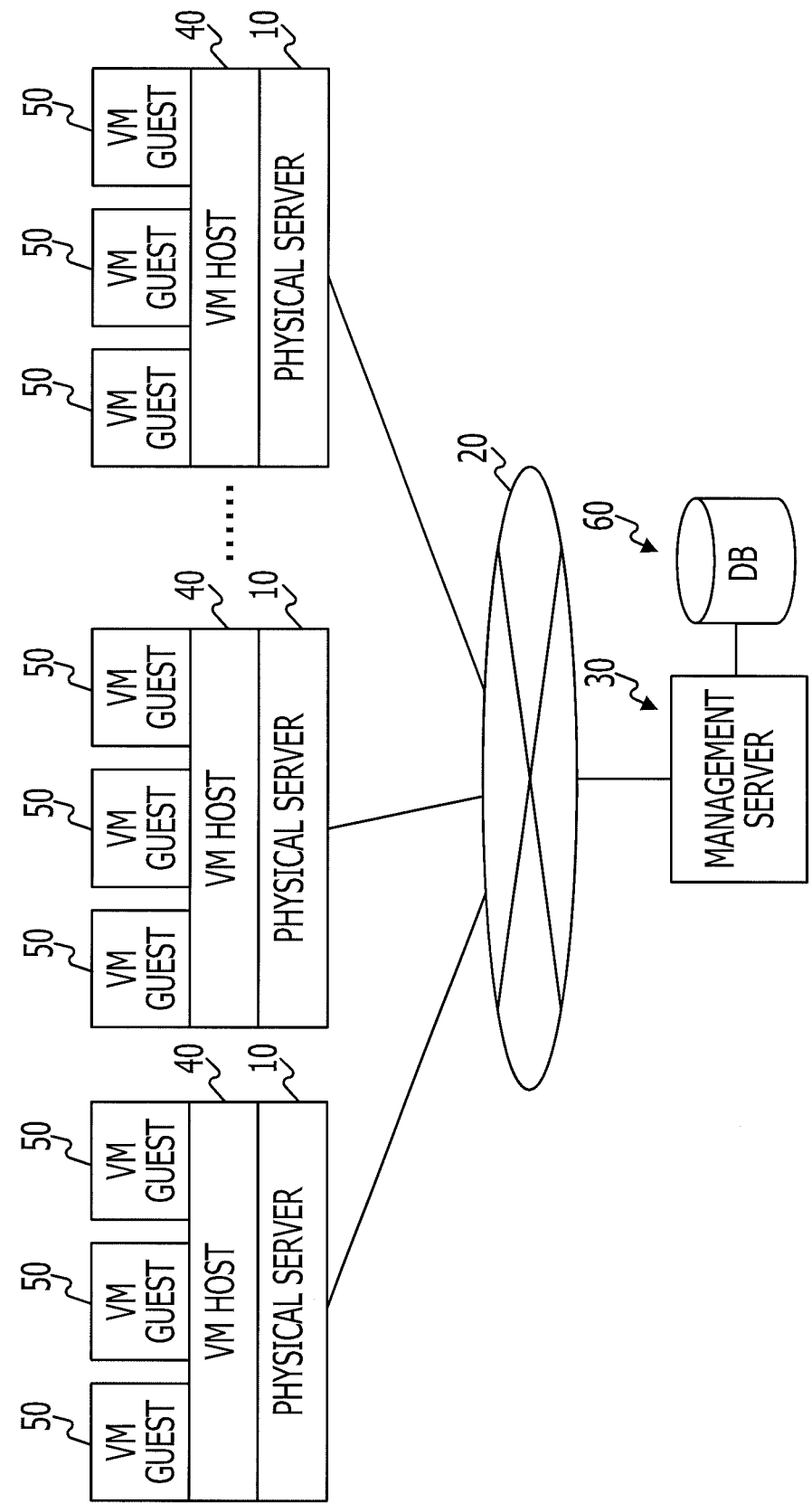
FIG. 1 is a block diagram of an entire information system to which technologies proposed herein have been applied.

FIG. 1 illustrates an entire structure of an information system to which the technologies proposed herein have been applied.

A plurality of physical servers 10 to be managed are connected to a management server 30 (a virtual machine management device), which includes a general-purpose computer, via a computer network 20 such as the Internet. Each of the physical servers 10 can operate one or more virtual machine (VM) guests 50 by installing a VM host 40 serving as an operating system (OS) for operating VMs. Here, the VM guests 50 include a guest OS and an application that are operable on the VM host 40. Moreover, the management server 30 is equipped with a database (DB) 60 for managing the physical servers 10 to be managed, more specifically, for managing VM hosts 40 and VM guests 50 that are operable on the physical servers 10.

Figure 2:
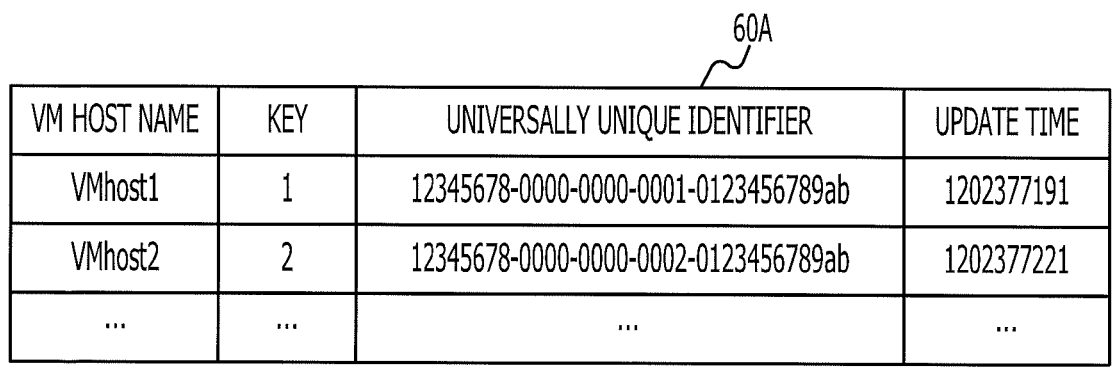
FIG. 2 is a diagram of virtual machine (VM) host information registered in a database (DB)
Figure 3:
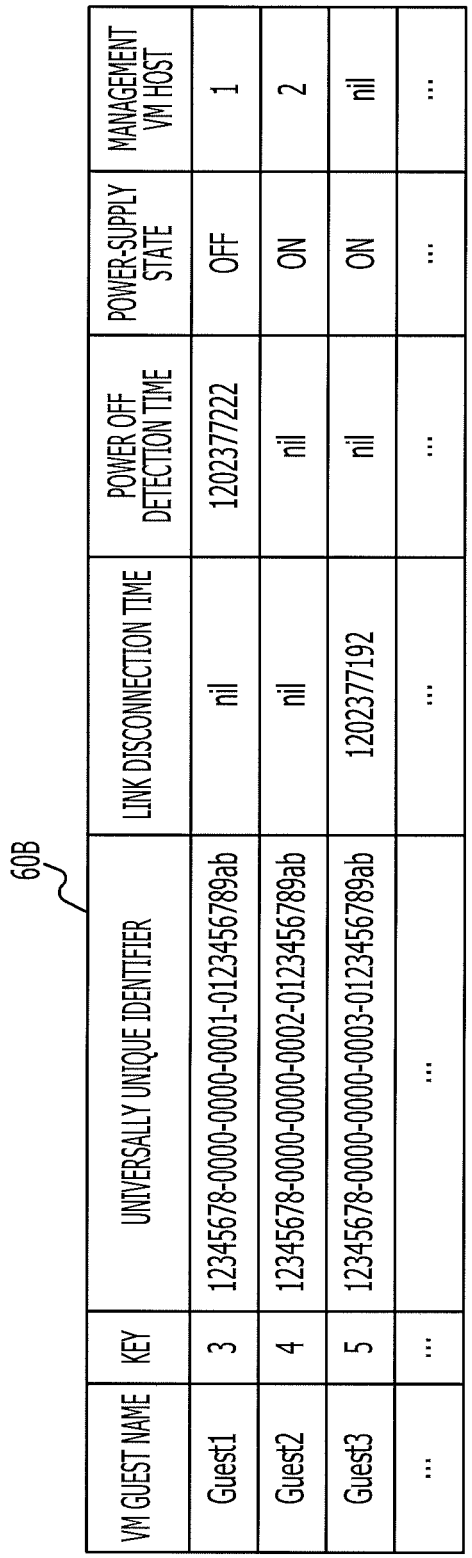
FIG. 3 is a diagram of VM guest information registered in the DB.

As illustrated in FIGS. 2 and 3, VM host information 60A regarding each of the VM hosts 40 and VM guest information 60B regarding each of the VM guests 50 are registered in the DB 60.

As illustrated in FIG. 2, the VM host information 60A includes records, in each of which a VM host name, a key, a universally unique identifier (UUID), and an update time are related to each other. The VM host name is a character string representing a corresponding one of the VM hosts 40. The key is a value (number) used to uniquely identify the VM host 40 in the DB 60. The UUID is an identifier used to uniquely identify the VM host 40 in the information system. The update time represents a date and time at which the record in the VM host information 60A was last updated, and is represented by a number indicating the number of seconds that have elapsed since, for example, a starting point of calculation Jan. 1, 1970 00:00:00.

As illustrated in FIG. 3, the VM guest information 60B includes records, in each of which a VM guest name, a key, a UUID, a link disconnection time, a power OFF detection time, a power-supply state, and a management VM host (link relation information) are related to each other. The VM guest name is a character string representing a corresponding one of the VM guests 50. The key is a value (number) used to uniquely identify the VM guest 50 in the DB 60. The UUID is an identifier used to uniquely identify the VM guest 50 in the information system. The link disconnection time represents a date and time at which the link between the VM guest 50 and a corresponding one of the VM hosts 40 is disconnected, and is represented by a number indicating the number of seconds that have elapsed since, for example, the starting point of calculation Jan. 1, 1970 00:00:00. Here, when the link between the VM guest 50 and the VM host 40 is not disconnected, the link disconnection time is set to, for example, "nil". The power OFF detection time represents a date and time at which it is detected that the VM guest 50 is in the power OFF state, and is represented by a number indicating the number of seconds that have elapsed since, for example, the starting point of calculation Jan. 1, 1970 00:00:00. Here, when the power supply for the VM guest 50 is not turned off, the power OFF detection time is set to, for example, "nil". The power-supply state represents the power-supply state (ON or OFF) of the VM guest 50. The management VM host represents the VM host 40 managing the VM guest 50, that is, the VM host 40 linked to the VM guest 50. For example, the management VM host is represented by the key of the VM host 40. Here, if a VM host 40 for the VM guest 50 is unknown, the management VM host is set to, for example, "nil". Here, the power OFF detection time, the power-supply state, and the management VM host in the VM guest information 60B are automatically updated by means of a known life-cycle management function installed in the VM host 40.

Figure 4:
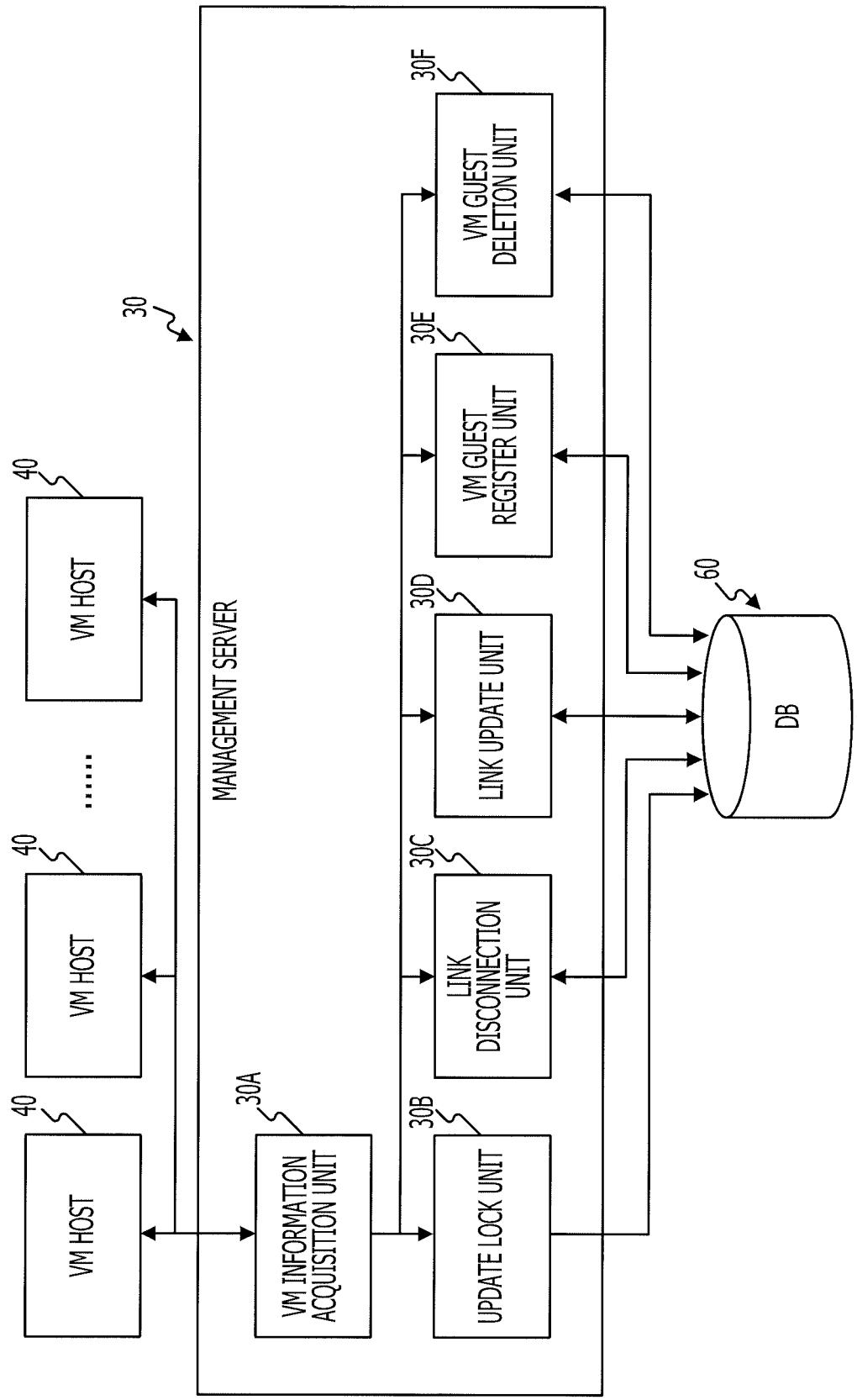
FIG. 4 is a block diagram illustrating an example of various functions realized by a management server.
Figure 5:
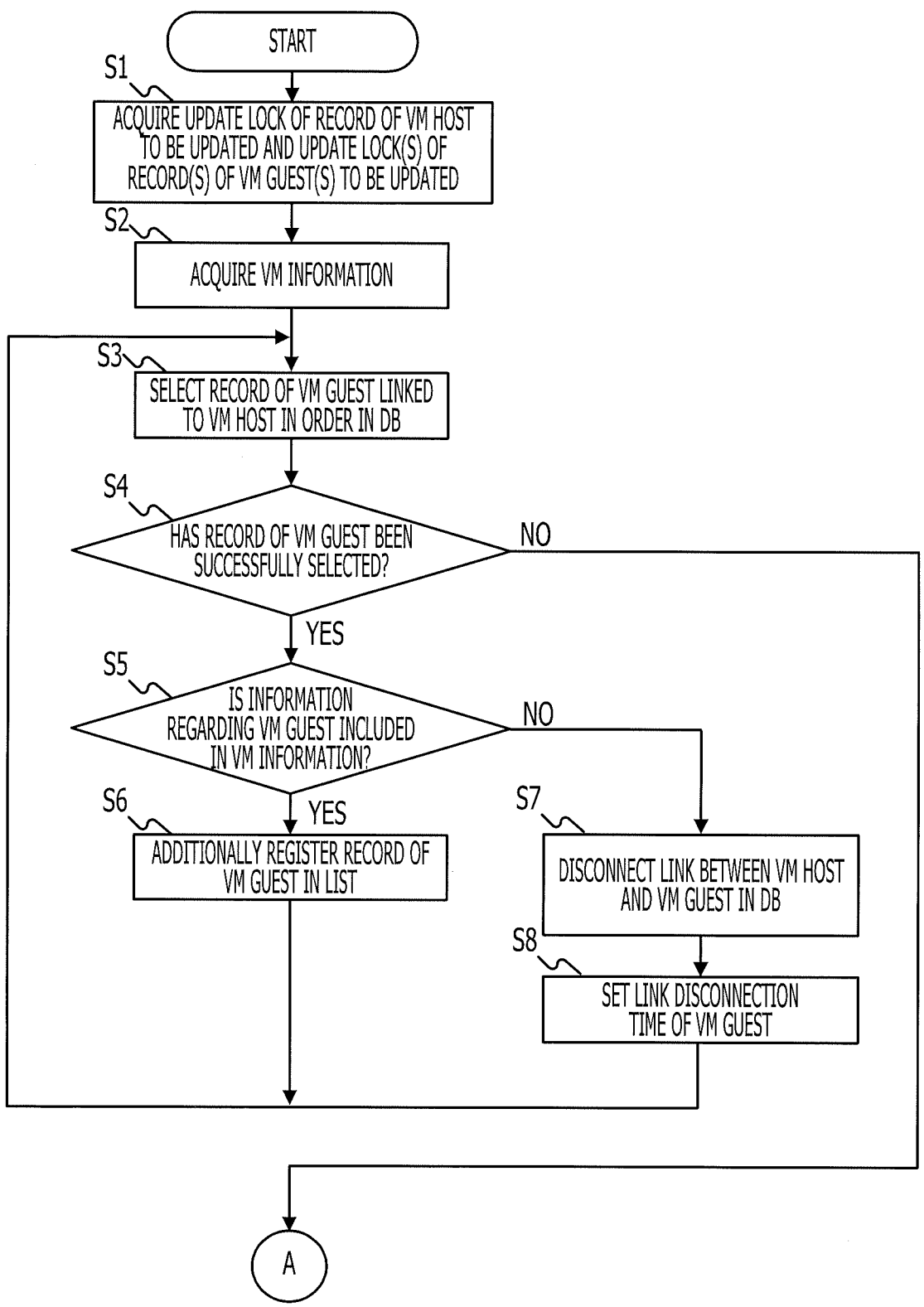
FIG. 5 is a part of a flowchart of VM management processing.
Figure 6:
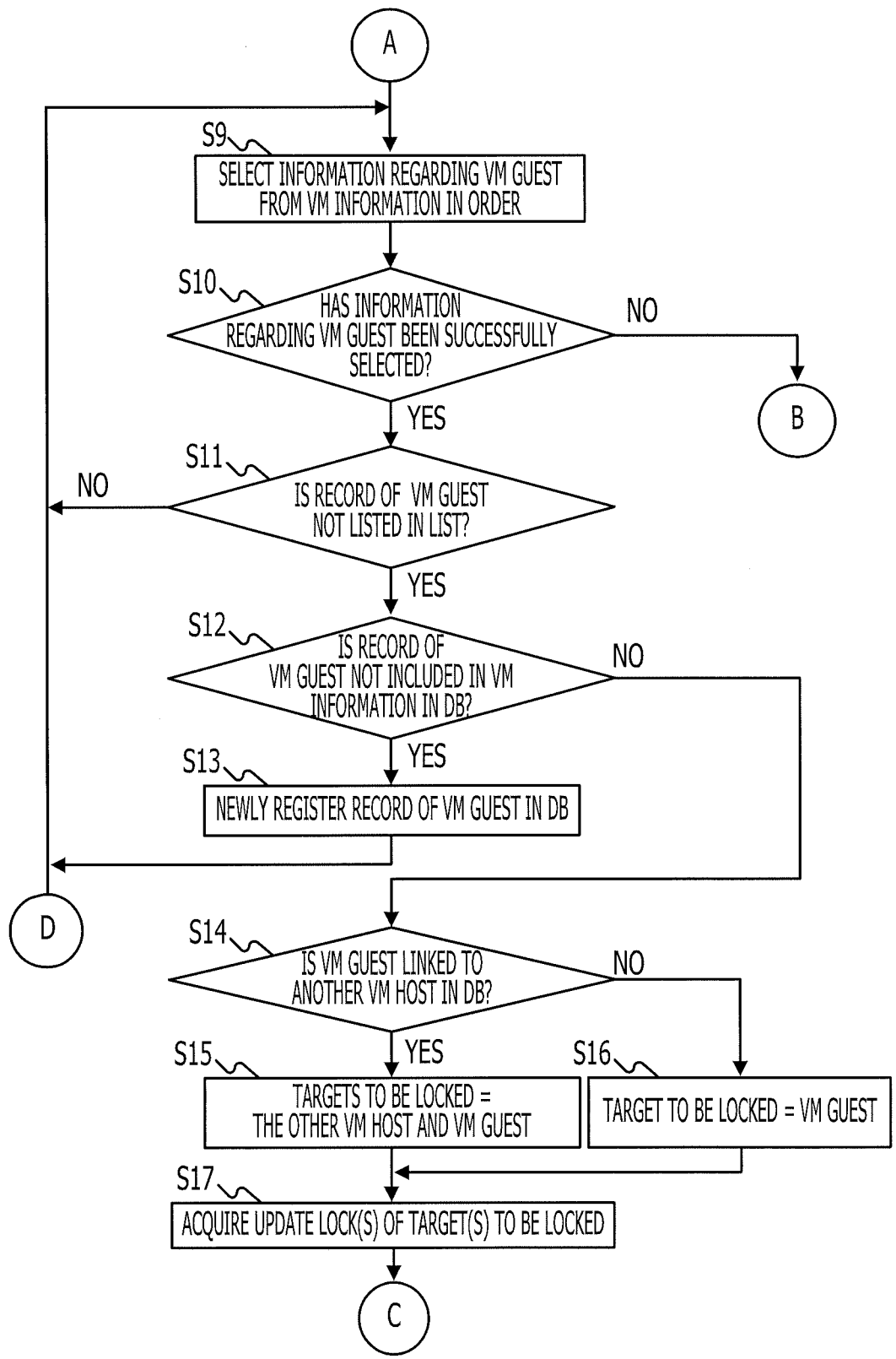
FIG. 6 is another part of the flowchart of VM management processing.
Figure 7:
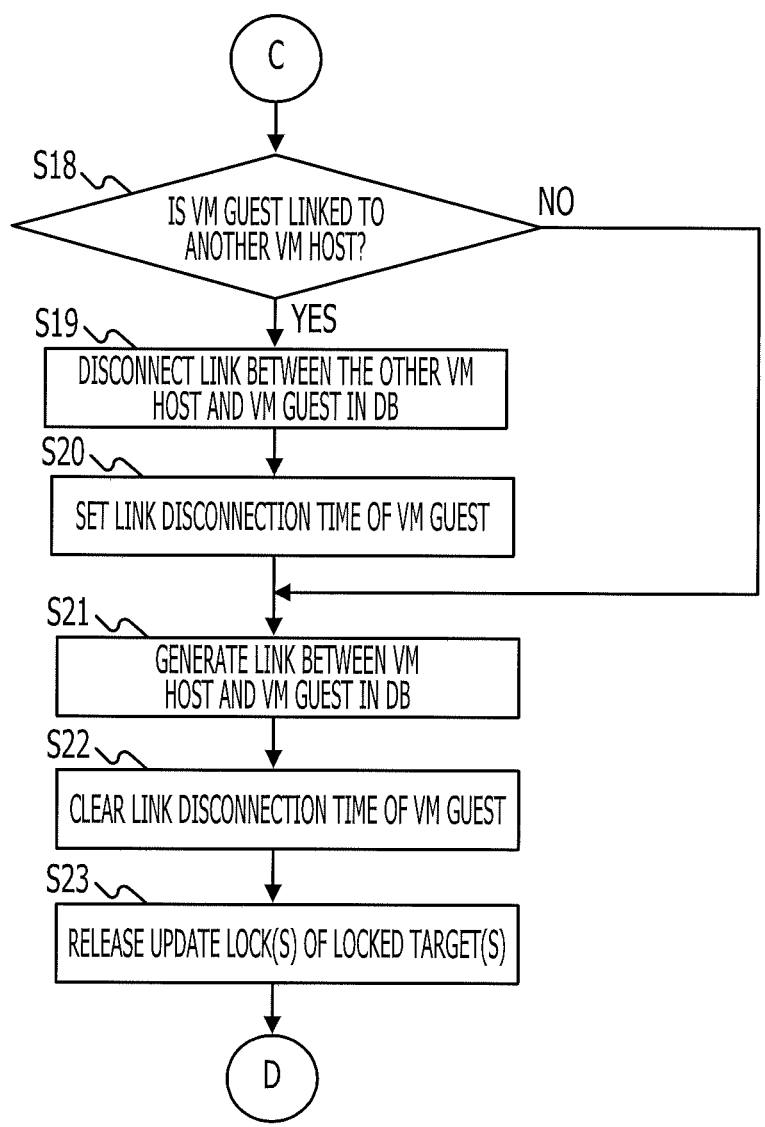
FIG. 7 is another part of the flowchart of VM management processing.
Figure 8:
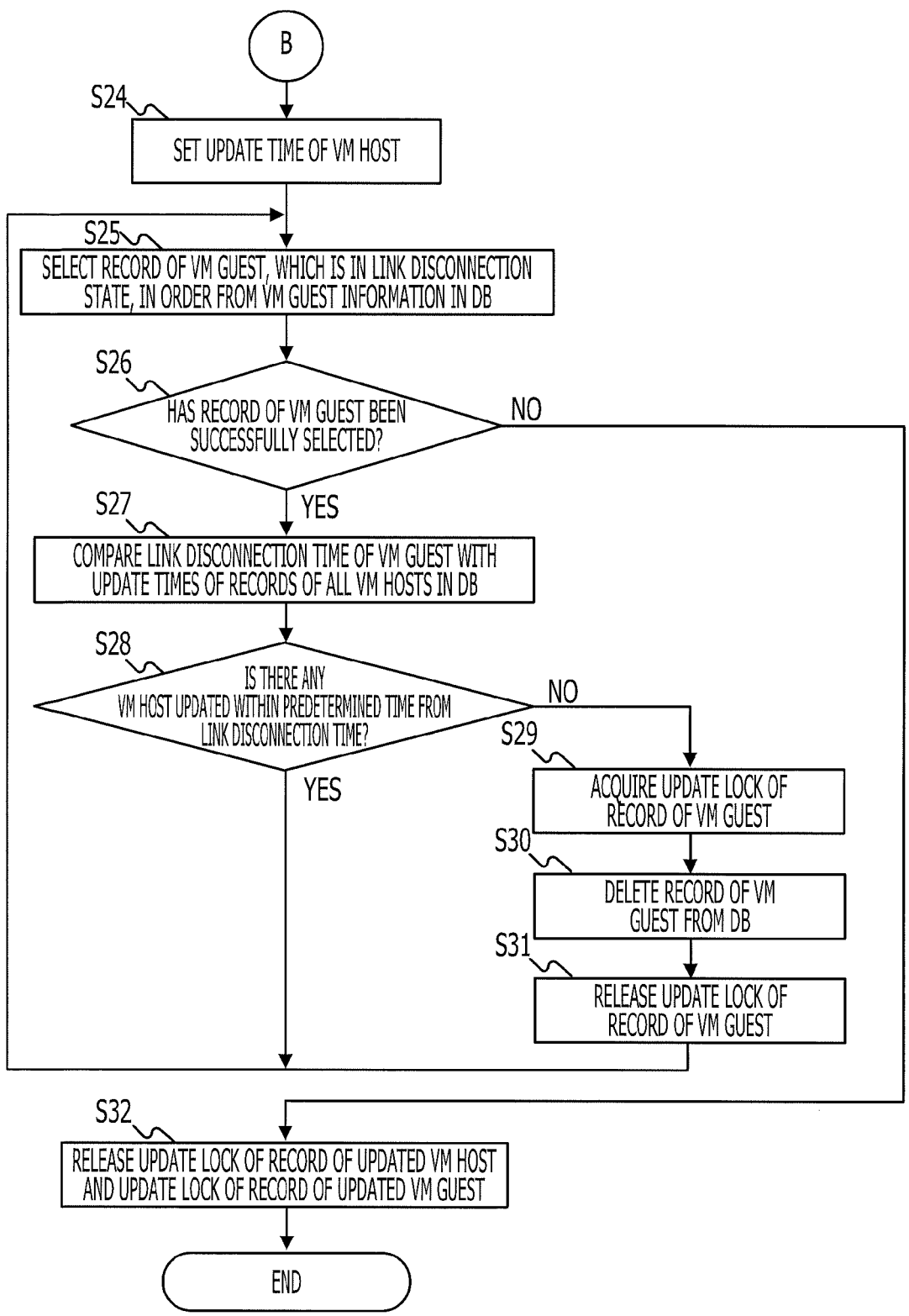
FIG. 8 is the remaining part of the flowchart of VM management processing.

As illustrated in FIG. 4, the management server 30 realizes a VM information acquisition unit 30A, an update lock unit 30B, a link disconnection unit 30C, a link update unit 30D, a VM guest register unit 30E, and a VM guest deletion unit 30F by executing a VM management program. Here, the VM management program is installed on a storage such as a hard disk of the management server 30 from a non-transitory computer-readable recording medium such as a compact disc-read-only memory (CD-ROM) and other computer-readable recording devices (ROM, RAM, HDD etc.).

Here, the VM information acquisition unit 30A functions as VM information acquisition means. The link disconnection unit 30C functions as link disconnection means. The link update unit 30D functions as link update means. The VM guest deletion unit 30F functions as VM guest deletion means.

The VM information acquisition unit 30A acquires, from the VM host 40 of each of the physical servers 10, VM information representing what VM guest or what VM guests are installed on the VM host 40. The update lock unit 30B locks a record or records to be updated in the VM host information 60A and VM guest information 60B in the DB 60 in such a manner that the record or records in the VM host information 60A and VM guest information 60B are not updated by another processing. The link disconnection unit 30C updates the link relation information stored in the DB 60 in such a manner that the link information has a link relation in which the link between the VM host 40 and the VM guest 50 is disconnected, in accordance with the VM information and the VM host information 60A and VM guest information 60B stored in the DB 60. The link update unit 30D updates the link relation information stored in the DB 60 in such a manner that the link relation information has a link relation in which there is a link between the VM host 40 and the VM guest 50, in accordance with the VM information and the VM host information 60A and VM guest information 60B stored in the DB 60. The VM guest register unit 30E additionally registers a record of a new VM guest in the VM guest information 60B in the DB 60 in accordance with the VM information and the VM host information 60A and VM guest information 60B stored in the DB 60. The VM guest deletion unit 30F deletes a record of a VM guest from the VM guest information 60B in the DB 60 in accordance with the VM information and the VM host information 60A and VM guest information 60B stored in the DB 60.

FIGS. 5 to 8 illustrate an example of VM management processing executed by the management server 30 repeatedly at predetermined time intervals, the execution being performed, for example, in accordance with a preset schedule or an instruction from an administrator of the information system. The VM management processing is sequentially performed on the VM hosts 40 on the physical servers 10 that form part of the information system in a circulating manner from one VM host 40 to another. Here, a VM host to be a target on which VM management processing is performed is called a "VM host" in the following unless otherwise specified.

In step 1, the update lock unit 30B acquires the update lock of a record of a VM host 40 and the update lock of a record of a VM guest 50 or the update locks of records of VM guests 50 by referring to the VM host information 60A and VM guest information 60B stored in the DB 60, the VM host 40 and the VM guest or guests 50 being to be updated. That is, the update lock unit 30B acquires the update locks of the records of the VM host 40 and VM guest or guests 50 linked to the VM host 40. (Step 1 is abbreviated as "S1" in the drawing. Hereinafter other steps are treated likewise.) Here, the VM host 40 and the VM guest or guests 50 are specified by using UUIDs. (Other VM hosts 40 and VM guests 50 are specified likewise.)

In step 2, the VM information acquisition unit 30A acquires the VM information organized in the VM host 40 on the physical server 10 by, for example, making an inquiry to the VM host 40.

In step 3, the link disconnection unit 30C refers to the VM host information 60A and VM guest information 60B stored in the DB 60 and selects, in order, the record of a VM guest 50 linked to the VM host 40. That is, the link disconnection unit 30C reads the key of the VM host 40 from the VM host information 60A and selects, in order, the record of a VM guest 50 having the key set in the management VM host in the VM guest information 60B. Here, a VM guest whose record has been selected is called a "VM guest" in the following unless otherwise specified.

In step 4, the link disconnection unit 30C determines whether the record of a VM guest 50 has been successfully selected in step 3, that is, whether the records of all the VM guests 50 linked to the VM host 40 have been processed.

Then, if the link disconnection unit 30C determines that a VM guest 50 has been successfully selected in step 3 (YES in step 4), the procedure proceeds to step 5. If the link disconnection unit 30C determines that the record of a VM guest 50 has not successfully selected in step 3 (the records of all the VM guests 50 have been processed) (NO in step 4), the procedure proceeds to step 9.

In step 5, the link disconnection unit 30C determines whether the VM information includes information regarding the VM guest 50. Then, if the link disconnection unit 30C determines that the VM information includes information regarding the VM guest 50 (YES in step 5), the procedure proceeds to step 6. If the link disconnection unit 30C determines that the VM information does not include information regarding the VM guest 50 (NO in step 5), the procedure proceeds to step 7.

In step 6, the VM guest register unit 30E additionally registers a record of the VM guest 50 in a list which is temporary and whose storage area is allocated in a memory or the like. Thereafter, the procedure returns to step 3.

In step 7, the link disconnection unit 30C disconnects, in the DB 60, the link between the VM host 40 and the VM guest 50 by setting the management VM host of the VM guest 50 to "nil" in the VM guest information 60B in the DB 60.

In step 8, the link disconnection unit 30C sets the link disconnection time of the VM guest 50 to the current time in the VM guest information 60B in the DB 60. Thereafter, the procedure returns to step 3. Here, the current time should be acquired using, for example, a clock function of the management server 30.

In step 9, the VM guest register unit 30E selects, in order, information regarding a VM guest 50 from the VM information.

In step 10, the VM guest register unit 30E determines whether information regarding a VM guest 50 has been successfully selected in step 9, that is, whether information regarding all the VM guests 50 has been processed, the information regarding all the VM guests 50 being included in the VM information. Then, if the VM guest register unit 30E determines that the information regarding a VM guest 50 has been successfully selected in step 9 (YES in step 10), the procedure proceeds to step 11. If the VM guest register unit 30E determines that the information regarding a VM guest 50 has not been successfully selected in step 9 (the information regarding all the VM guests 50 has been processed) (NO in step 10), the procedure proceeds to step 24.

In step 11, the VM guest register unit 30E determines whether the record of the VM guest 50 is listed in the list by referring to the list. Then, if the VM guest register unit 30E determines that the record of the VM guest 50 is not listed in the list (NO in step 11), the procedure proceeds to step 12. If the VM guest register unit 30E determines that the record of the VM guest 50 is listed in the list (YES in step 11), the procedure proceeds to step 9.

In step 12, the VM guest register unit 30E determines whether the record of the VM guest 50 is listed in the VM guest information 60B by referring to the VM guest information 60B stored in the DB 60. Then, if the VM guest register unit 30E determines that the record of the VM guest 50 is not listed in the VM guest information 60B (NO in step 12), the procedure proceeds to step 13. If the VM guest register unit 30E determines that the record of the VM guest 50 is listed in the VM guest information 60B (YES in step 12), the procedure proceeds to step 14.

In step 13, the VM guest register unit 30E newly registers a record of the VM guest 50 in the VM guest information 60B in the DB 60. Thereafter, the procedure returns to step 9.

In step 14, the update lock unit 30B determines whether the VM guest 50, which is linked to the VM host 40, is linked to another VM host 40 by referring to the VM guest information 60B stored in the DB 60. Then, if the update lock unit 30B determines that the VM guest 50 is linked to another VM host 40 (YES in step 14), the procedure proceeds to step 15. If the update lock unit 30B determines that the VM guest 50 is not linked to another VM host 40 (the VM guest 50 is in the link disconnection state) (NO in step 14), the procedure proceeds to step 16.

In step 15, the update lock unit 30B sets the other VM host 40 and the VM guest 50 to targets to be locked.

In step 16, the update lock unit 30B sets the VM guest 50 to be a target to be locked.

In step 17, the update lock unit 30B acquires the update lock of the record, which is the target to be locked, or the update locks of the records, which are the targets to be locked.

In step 18, the link disconnection unit 30C determines whether the VM guest 50 is linked to another VM host 40 by referring to the VM guest information 60B stored in the DB 60. Then, if the link disconnection unit 30C determines that the VM guest 50 is linked to another VM host 40 (YES in step 18), the procedure proceeds to step 19. If the link disconnection unit 30C determines that the VM guest 50 is not linked to another VM host 40 (the VM guest 50 is in the link disconnection state) (NO in step 18), the procedure proceeds to step 21.

In step 19, the link disconnection unit 30C disconnects, in the DB 60, the link between the other VM host 40 and the VM guest 50 by setting the management VM host of the VM guest 50 to "nil" in the VM guest information 60B in the DB 60.

In step 20, the link disconnection unit 30C sets the link disconnection time of the VM guest 50 to the current time in the VM guest information 60B in the DB 60.

In step 21, the link update unit 30D generates, in the DB 60, a link between the VM host 40 and the VM guest 50 by setting the management VM host of the VM guest 50 to have the key of the VM host 40 in the VM guest information 60B in the DB 60.

In step 22, the link update unit 30D clears the link disconnection time of the VM guest 50 by setting the link disconnection time of the VM guest 50 to "nil" in the VM guest information 60B in the DB 60.

In step 23, the update lock unit 30B releases the update lock of the record, which is the target to be locked, or the update locks of the records, which are the targets to be locked. Thereafter, the procedure returns to step 9.

In step 24, the VM guest deletion unit 30F sets the update time of the VM host 40 to the current time in the VM host information 60A in the DB 60.

In step 25, the VM guest deletion unit 30F selects, in order, the record of a VM guest 50, which is in the link disconnection state, that is, the record of a VM guest 50 whose management VM host is set to "nil", by referring to the VM guest information 60B stored in the DB 60.

In step 26, the VM guest deletion unit 30F determines whether the record of a VM guest 50 has been successfully selected in step 25, that is, the records of all the VM guests 50 that are in the link disconnection state according to the VM guest information 60B stored in the DB 60 have been processed. Then, if the VM guest deletion unit 30F determines that the record of a VM guest 50 has been successfully selected in step 25 (YES in step 26), the procedure proceeds to step 27. If the VM guest deletion unit 30F determines that the record of a VM guest 50 has not been successfully selected in step 25 (the records of all the VM guests 50 have been processed) (NO in step 26), the procedure proceeds to step 32.

In step 27, the VM guest deletion unit 30F compares the link disconnection time of the VM guest 50 with the update times at which the records of all the VM hosts 40 were last updated, by referring to the VM host information 60A and VM guest information 60B stored in the DB 60.

In step 28, the VM guest deletion unit 30F determines whether there is a record of a VM host 40 updated within a predetermined time from the link disconnection time of the VM guest 50 by using a comparison result obtained in step 27. Here, the predetermined time is set to, for example, one minute in consideration of a time necessary to update the records of the VM hosts 40 on all the physical servers 10 that form part of the information system. Then, if the VM guest deletion unit 30F determines that there is a record of a VM host 40 updated within the predetermined time (YES in step 28), the procedure returns to step 25. If the VM guest deletion unit 30F determines that there is not a record of a VM host 40 updated within the predetermined time (NO in step 28), the procedure proceeds to step 29.

In step 29, the update lock unit 30B acquires the update lock of the record of the VM guest 50 in the VM guest information 60B in the DB 60.

In step 30, the VM guest deletion unit 30F deletes the record of the VM guest 50 from the VM guest information 60B stored in the DB 60. Here, it is desirable to output, in a log file or the like, information regarding the fact that the record of the VM guest 50 has been deleted from the DB 60 in order to make it possible to recognize the fact easily.

In step 31, the update lock unit 30B releases the update lock of the record of the VM guest 50. Thereafter, the procedure returns to step 25.

In step 32, the update lock unit 30B releases the update locks of the records of the VM host 40 and VM guest or guests 50, which have been updated.

According to the management server 30 as described above, when a VM guest 50 listed in the DB 60 cannot be acquired by a certain VM host 40, it is determined that there is a high probability that the VM guest 50 has been migrated or deleted, and the link between the certain VM host 40 and the VM guest 50 is disconnected. In contrast, when a VM guest 50 unlisted in the DB 60 is acquired by a certain VM host 40, and the VM guest 50 is in the link disconnection state, the link between the certain VM host 40 and the VM guest 50 is generated. Moreover, when a VM guest 50 unlisted in DB 60 is acquired by a certain VM host 40 and the VM guest 50 is not linked to another VM host 40 in the DB 60, the record of the VM guest 50 is newly registered as a record of a VM guest 50 linked to the certain VM host 40 in the DB 60. Furthermore, when a VM guest 50 linked to another VM host 40 in the DB 60 is acquired by a certain VM host 40, the link between the other VM host 40 and the VM guest 50 is disconnected and the link between the certain VM host 40 and the VM guest 50 whose link to the other VM host 40 has just been disconnected is generated.

Briefly speaking, when information regarding a first VM guest 50 linked to a VM host 40 in the DB 60 cannot be acquired from the VM host 40, the link between the VM host 40 and the first VM guest 50 is disconnected in the DB 60. Moreover, when information regarding a second VM guest 50 linked to another VM host 40 different from a VM host 40 in the DB 60 is acquired from the VM host 40, the link between the VM host 40 and the second VM guest 50 is generated in the DB 60.

Here, in order to make the function of the management server 30 described above be understood easily, migration of a VM guest will be described using simple examples.

Figure 9:
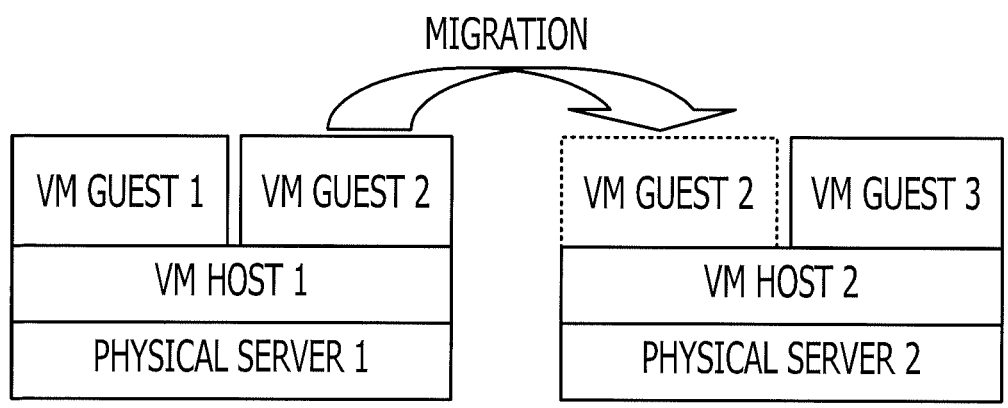
FIG. 9 is a diagram of VM guest migration processing.

As a non-limiting example, just before migration of a VM guest, as illustrated in FIG. 9, imagine a case in which VM guests 1 and 2 are installed on a VM host 1 on a physical server 1 and a VM guest 3 is installed on a VM host 2 on a physical server 2. Then, the VM guest 2 on the physical server 1 is migrated to the physical server 2.

Figure 10:
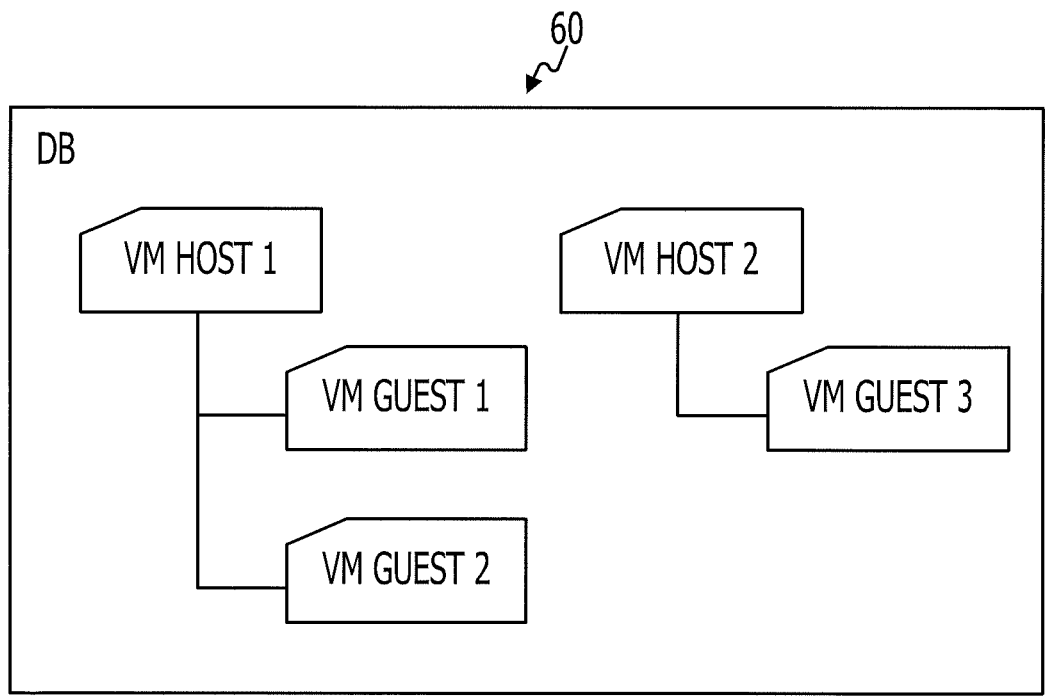
FIG. 10 is a diagram of a DB state just before migration of a VM guest.
Figure 11:
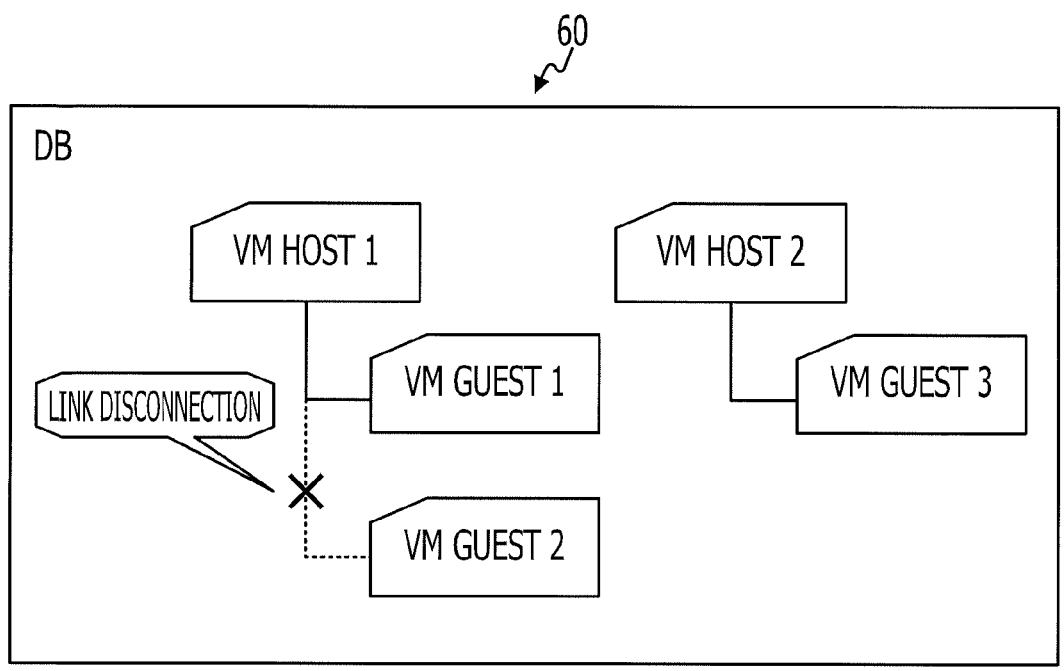
FIG. 11 is a diagram of a DB state during migration of the VM guest.
Figure 12:
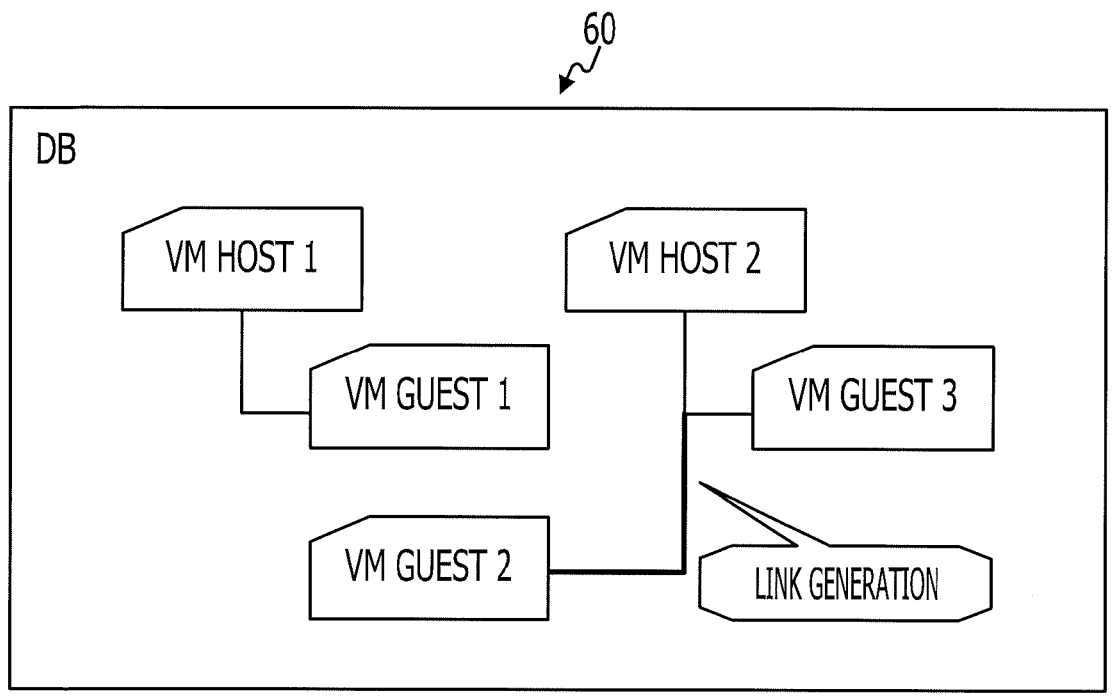
FIG. 12 is a diagram of a DB state just after migration of the VM guest.

Just before migration of the VM guest 2, as illustrated in FIG. 10, the VM guests 1 and 2 are linked to the VM host 1 in the DB 60, and the VM guest 3 is linked to the VM host 2 in the DB 60. When the VM guest 2 on the VM host 1 is migrated to the VM host 2, information regarding the VM guest 2 listed in the DB 60 cannot be acquired from the VM host 1. Thus, as illustrated in FIG. 11, the link between the VM host 1 and the VM guest 2 is disconnected. In this situation, the VM guest 2 is listed in the DB 60 as being in the link disconnection state. Thereafter, when information regarding the VM guest 2 listed in the DB 60 is acquired from the VM host 2, since the VM guest 2 is in the link disconnection state, a link between the VM host 2 and the VM guest 2 is generated as illustrated in FIG. 12.

Thus, even operators other than the operator who migrated a VM guest 50 can determine whether the VM guest 50 on a physical server 10 disappears as a result of migration or deletion of the VM guest 50 by investigating the content of the DB 60. Thus, the amount of effort required for an administrator to manage VMs can be reduced.

When a certain VM guest 50 is deleted from targets to be managed in the information system, the VM guest 50 whose link to a VM host 40 is disconnected is left listed in the DB 60. If the VM guest 50 is not acquired by any of the VM hosts 40 at or before a time at which updating of the records of all the VM hosts 40 is finished after the link between the VM guest 50 and the VM host 40 was disconnected, it can be determined that the VM guest 50 was deleted. Then, if it is determined that the VM guest 50 was deleted, the record of the VM guest 50 is deleted from the DB 60.

Briefly speaking, when information regarding the first VM guest 50 cannot be acquired from all the VM hosts 40 within a predetermined time after the link between a VM host 40 and the first VM guest 50 was disconnected, the record of the first VM guest 50 is deleted from the DB 60.

Here, in order to make the function of the management server 30 described above be understood easily, deletion of a VM guest will be described using simple examples.

Figure 13:
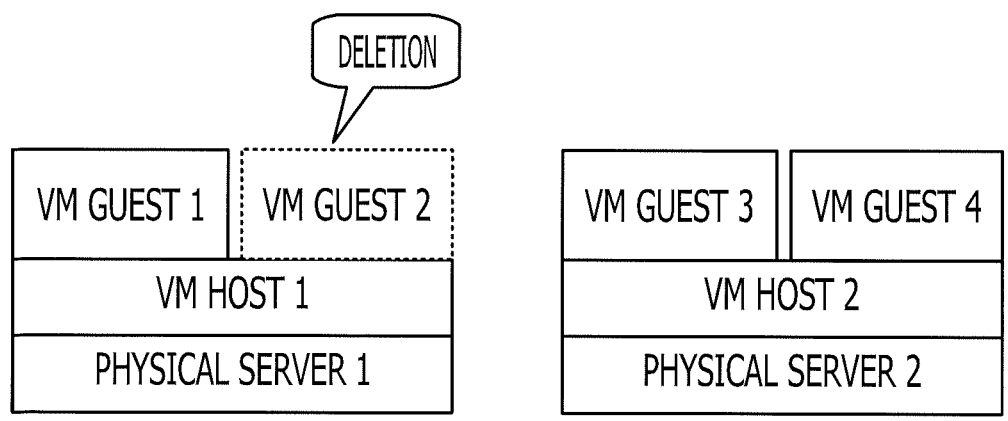
FIG. 13 is a diagram of VM guest deletion processing.

As a non-limiting example, just before deletion of a VM guest, as illustrated in FIG. 13, imagine a case in which the VM guests 1 and 2 are installed on the VM host 1 on the physical server 1 and the VM guest 3 and a VM guest 4 are installed on the VM host 2 on the physical server 2. Then, the VM guest 2 on the physical server 1 is deleted.

Figure 14:
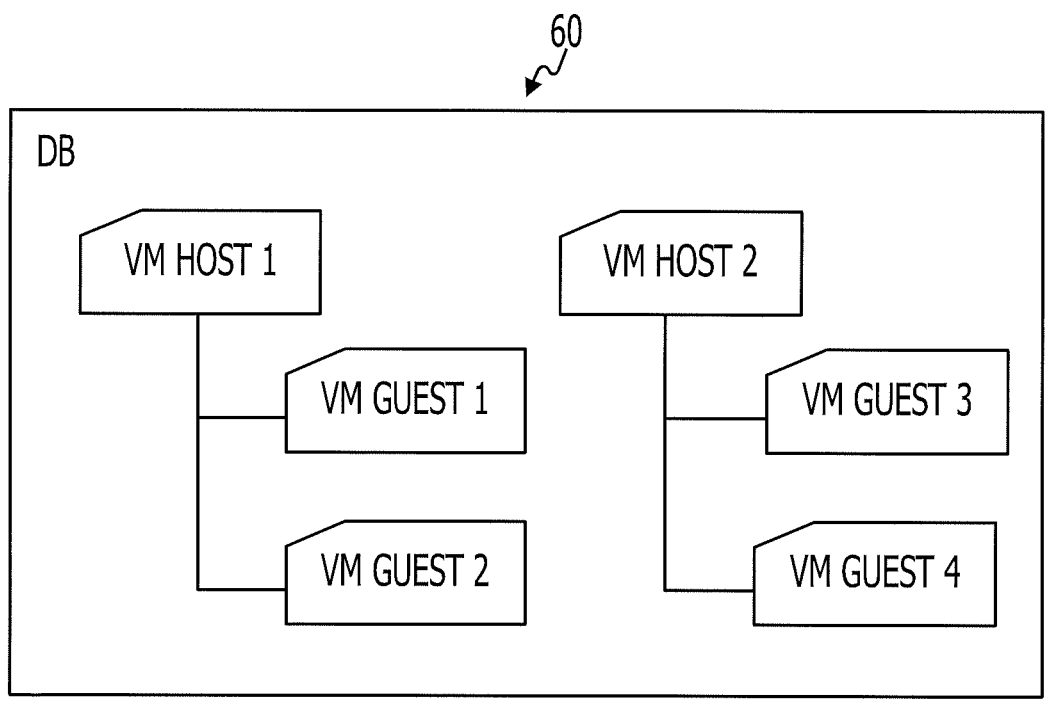
FIG. 14 is a diagram of a DB state just before deletion of a VM guest.
Figure 15:
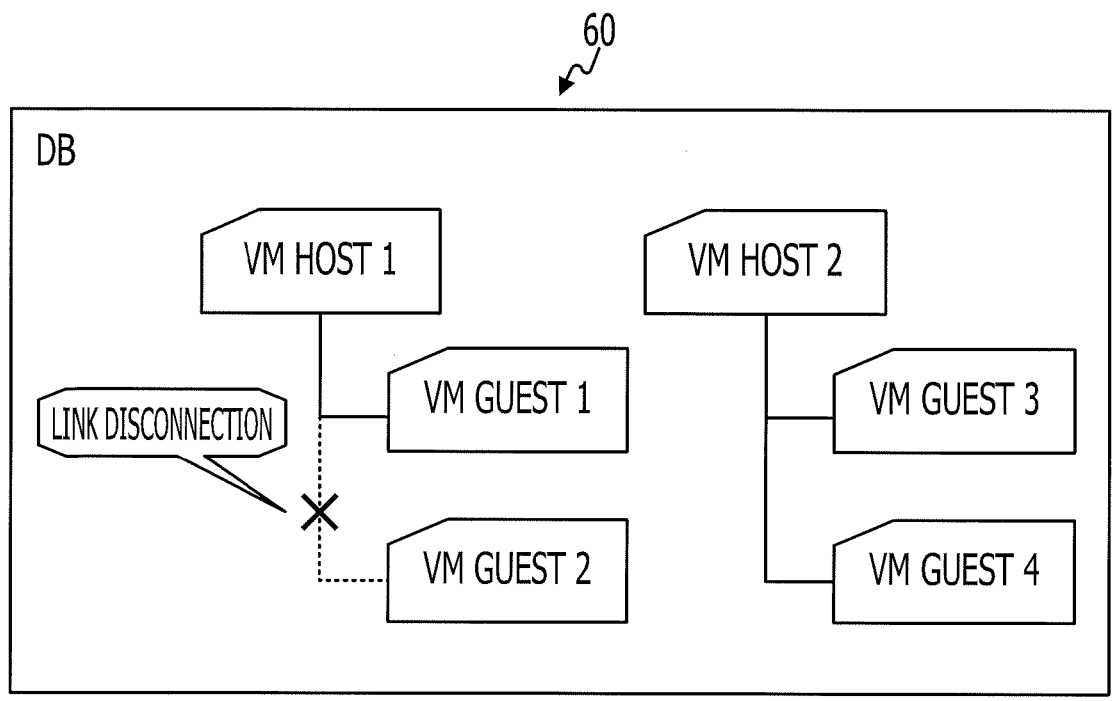
FIG. 15 is a diagram of a DB state during deletion of the VM guest.
Figure 16:
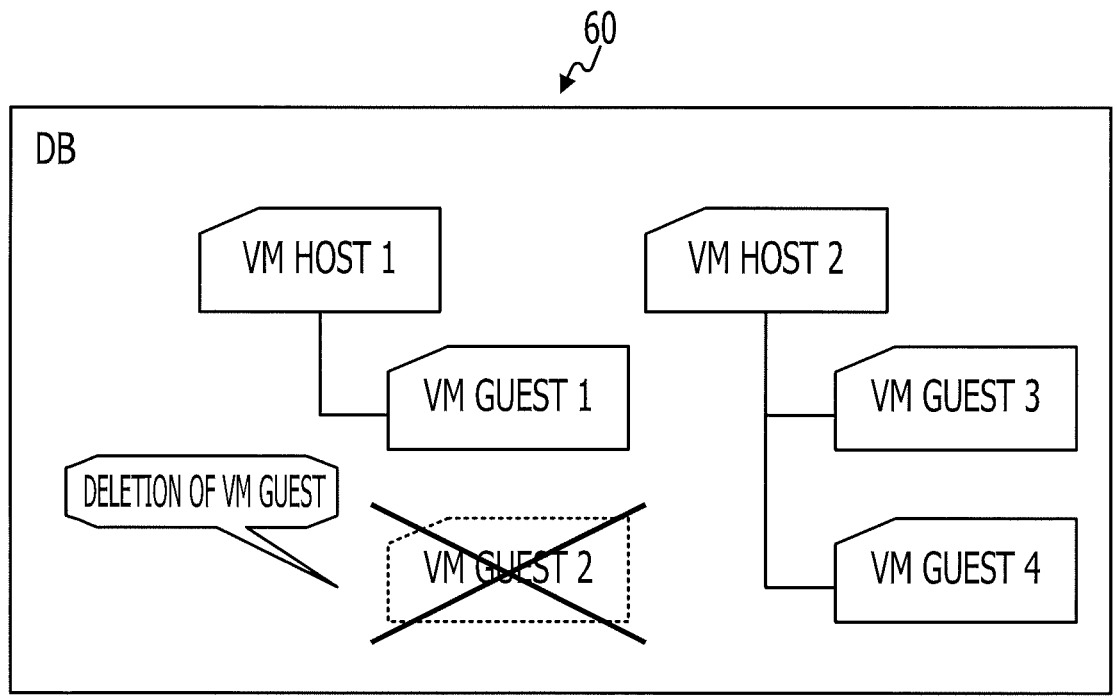
FIG. 16 is a diagram of a DB state just after deletion of the VM guest.

Just before deletion of the VM guest 2, as illustrated in FIG. 14, the VM guests 1 and 2 are linked to the VM host 1 in the DB 60, and the VM guests 3 and 4 are linked to the VM host 2 in the DB 60. When the VM guest 2 on the VM host 1 is deleted, information regarding the VM host 2 listed in the DB 60 cannot be acquired from the VM host 1. Thus, as illustrated in FIG. 15, the link between the VM host 1 and the VM guest 2 is disconnected. In this situation, the VM guest 2 is listed in the DB 60 as being in the link disconnection state. Thereafter, when information regarding the VM guest 2 cannot be acquired from the VM hosts 1 and 2 at or before a time at which the record of the VM host 2 is updated, the record of the VM guest 2 is deleted from the DB 60 as illustrated in FIG. 16.

Thus, even when a VM guest 50 is deleted, a case in which the VM guest 50 having no link to any VM host 40 is left listed indefinitely in the DB 60 can be prevented and unnecessary information can be prevented from existing in the DB 60.

Thus, the amount of effort required to check the content of the DB 60 can be reduced and furthermore, the amount of effort required for an administrator to manage VMs can be reduced.

Figure 17:
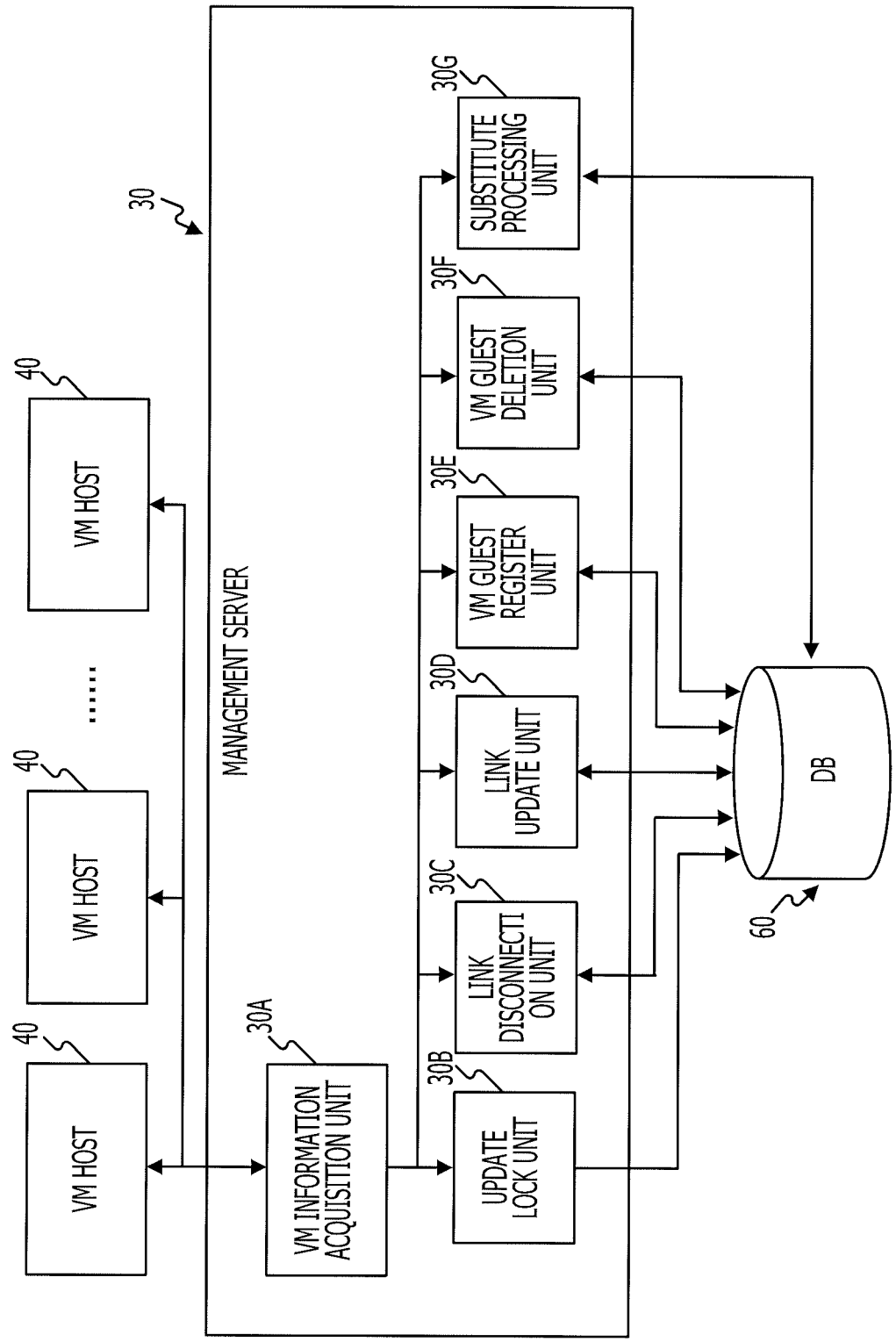
FIG. 17 is a block diagram illustrating another example of various functions realized by the management server.

When a life-cycle management function is not installed in VM hosts 40, there is no mechanism to specify which of the VM hosts 40 are currently managing and operating which of the VM guests 50 shared between the VM hosts 40. Thus, as illustrated in FIG. 17, a substitute processing unit 30G, which is realized by a VM management program, is further installed in the management server 30 in order to add a substitute processing function as a substitute for a life-cycle management function.

Figure 18:
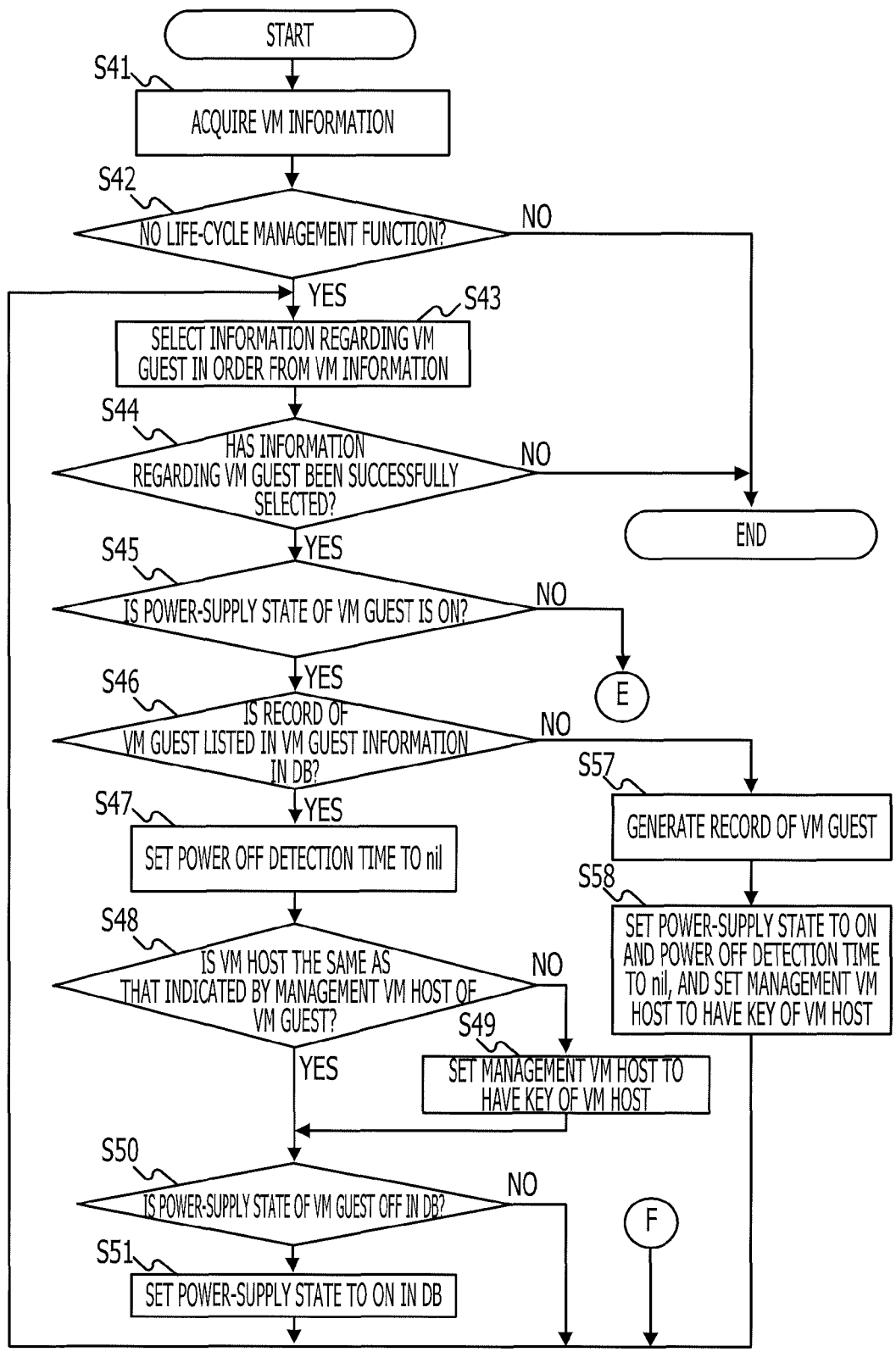
FIG. 18 is a part of a flowchart of life-cycle management substitute processing.
Figure 19:
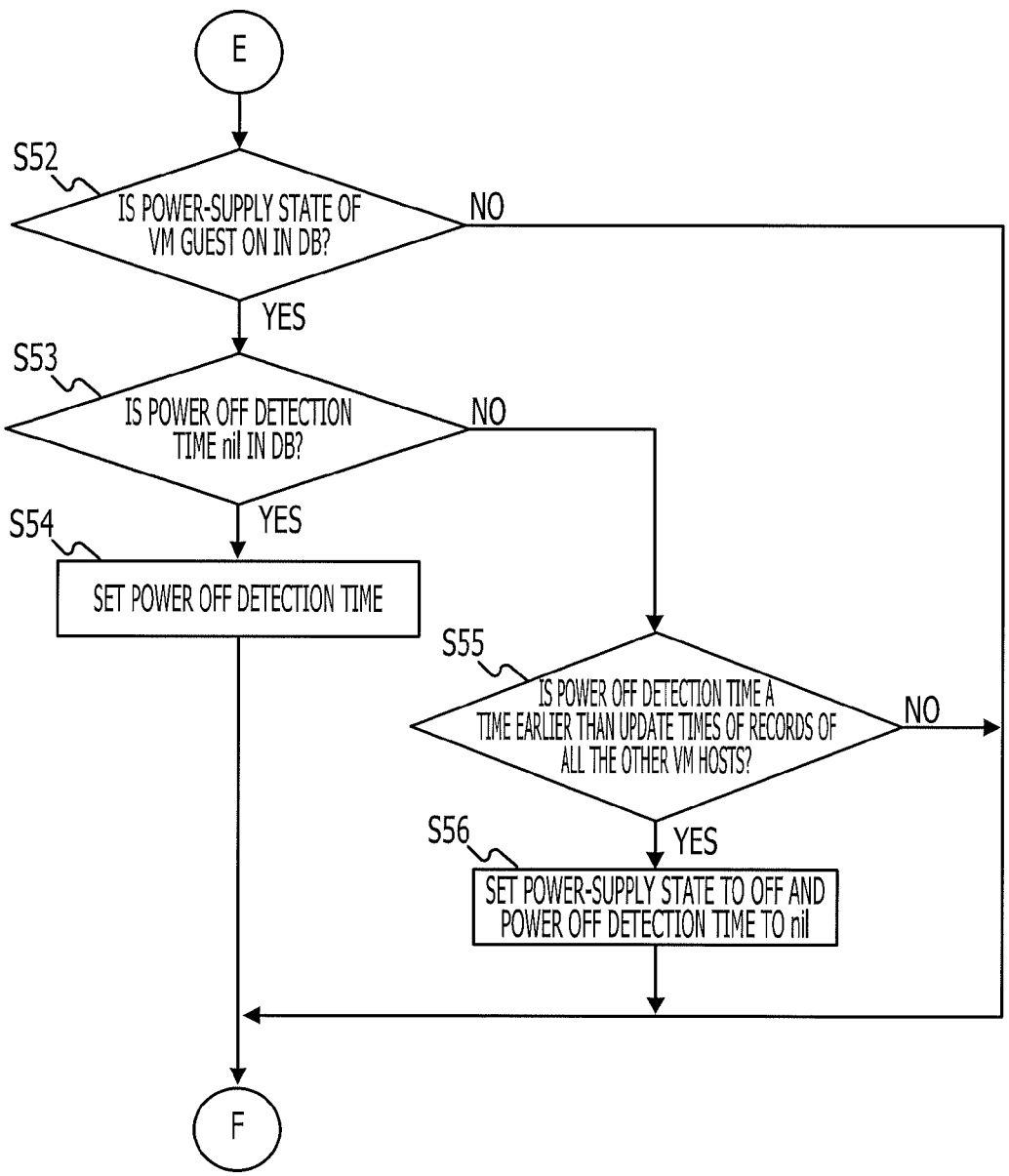
FIG. 19 is the remaining part of the flowchart of life-cycle management substitute processing.

FIGS. 18 and 19 illustrate an example of substitute processing repeatedly executed by the management server 30 at predetermined time intervals in parallel with the VM management processing illustrated in FIGS. 5 to 8. Here, similarly to the VM management processing, the substitute processing is sequentially performed on the VM hosts 40 on the physical servers 10 that form part of the information system in a circulating manner from one VM host 40 to another.

In step 41, the VM information acquisition unit 30A acquires VM information organized in a VM host 40 on a physical server 10 by, for example, making an inquiry to the VM host 40.

In step 42, the substitute processing unit 30G determines whether a life-cycle management function is installed in the VM host 40 in accordance with, for example, api type in the VM information. Then, if the substitute processing unit 30G determines that the life-cycle management function is not installed in the VM host 40 (NO in step 42), the procedure proceeds to step 43. If the substitute processing unit 30G determines that the life-cycle management function is installed in the VM host 40 (YES in step 42), the procedure ends. Here, examples of the VM host 40 in which a life-cycle management function is not installed include a red hat enterprise linux (RHEL) and a Xen (trademark).

In step 43, the substitute processing unit 30G selects information regarding a VM guest 50 in order from the VM information.

In step 44, the substitute processing unit 30G determines whether the information regarding a VM guest 50 has been successfully selected in step 43, that is, whether information regarding all the VM guests 50 has been processed, information regarding all the VM guests 50 being included in the VM information. Then, if the substitute processing unit 30G determines that the information regarding a VM guest 50 has been successfully selected in step 43 (YES in step 44), the procedure proceeds to step 45. If the substitute processing unit 30G determines that the information regarding a VM guest 50 has not been successfully selected in step 43 (the information regarding all the VM guests 50 has been processed) (NO in step 44), the procedure ends.

In step 45, the substitute processing unit 30G determines whether the power-supply state of the VM guest 50 is ON, that is, the VM guest 50 is running. Then, if the substitute processing unit 30G determines that the power-supply state of the VM guest 50 is ON (YES in step 45), the procedure proceeds to step 46. If the substitute processing unit 30G determines that the power-supply state of the VM guest 50 is not ON (the power-supply state of the VM guest 50 is OFF) (NO in step S45), the procedure proceeds to step 52.

In step 46, the substitute processing unit 30G determines whether the record of the VM guest 50 is listed in the VM guest information 60B by referring to the VM guest information 60B stored in the DB 60. Then, if the substitute processing unit 30G determines that the record of the VM guest 50 is listed in the VM guest information 60B (YES in step 46), the procedure proceeds to step 47. If the substitute processing unit 30G determines that the record of the VM guest 50 is not listed in the VM guest information 60B (NO in step 46), the procedure proceeds to step 57.

In step 47, the substitute processing unit 30G sets the power OFF detection time of the VM guest 50 to "nil" in the VM guest information 60B in the DB 60.

In step 48, the substitute processing unit 30G determines whether the VM host 40, on which the VM guest 50 is installed, is the same as that indicated by the management VM host of the VM guest 50 by referring to the VM guest information 60B in the DB 60. Then, if the substitute processing unit 30G determines that the VM host 40, on which the VM guest 50 is installed, is the same as that indicated by the management VM host of the VM guest 50 (YES in step 48), the procedure proceeds to step 50. If the substitute processing unit 30G determines that the VM host 40, on which the VM guest 50 is installed, is not the same as that indicated by the management VM host of the VM guest 50 (NO in step 48), the procedure proceeds to step 49.

In step 49, the substitute processing unit 30G sets the management VM host of the VM guest 50 to have the key of the VM host 40 in the VM guest information 60B in the DB 60. Thereafter, the procedure proceeds to step 50.

In step 50, the substitute processing unit 30G determines whether the power-supply state of the VM guest 50 is OFF by referring to the VM guest information 60B in the DB 60. Then, if the substitute processing unit 30G determines that the power-supply state of the VM guest 50 is OFF (YES in step 50), the procedure proceeds to step 51. If the substitute processing unit 30G determines that the power-supply state of the VM guest 50 is not OFF (the power-supply state of the VM guest 50 is ON) (NO in step 50), the procedure returns to step 43.

In step 51, the substitute processing unit 30G sets the power-supply state of the VM guest 50 to ON in the VM guest information 60B in the DB 60. Thereafter, the procedure returns to step 43.

In step 52, the substitute processing unit 30G determines whether the power-supply state of the VM guest 50 in the DB 60 is ON by referring to the VM guest information 60B in the DB 60. Then, if the substitute processing unit 30G determines that the power-supply state of the VM guest 50 is ON (YES in step 52), the procedure proceeds to step 53. If the substitute processing unit 30G determines that the power-supply state of the VM guest 50 is not ON (the power-supply state of the VM guest 50 is OFF) (NO in step 52), the procedure returns to step 43.

In step 53, the substitute processing unit 30G determines whether the power OFF detection time of the VM guest 50 is "nil" by referring to the VM guest information 60B in the DB 60. Then, if the substitute processing unit 30G determines that the power OFF detection time of the VM guest 50 is "nil" (YES in step 53), the procedure proceeds to step 54. If the substitute processing unit 30G determines that the power OFF detection time of the VM guest 50 is not "nil" (NO in step 53), the procedure proceeds to step 55.

In step 54, the substitute processing unit 30G sets the power OFF detection time of the VM guest 50 to the current time in the VM guest information 60B in the DB 60, and the procedure returns to step 43.

In step 55, the substitute processing unit 30G determines whether the condition that the power OFF detection time of the VM guest 50 is a time before the update times at which the records of all the other VM hosts 40 were last updated is satisfied by referring to the VM host information 60A in the DB 60. Then, if the substitute processing unit 30G determines that the condition is satisfied (YES in step 55), the procedure proceeds to step 56. If the substitute processing unit 30G determines that the condition is not satisfied (NO in step 55), the procedure returns to step 43.

In step 56, the substitute processing unit 30G sets the power-supply state of the VM guest 50 to OFF and the power OFF detection time to "nil" in the VM guest information 60B in the DB 60. Thereafter, the procedure returns to step 43.

In step 57, the substitute processing unit 30G generates a record of the VM guest 50 (the record is newly registered) in the VM guest information 60B in the DB 60.

In step 58, the substitute processing unit 30G sets the power-supply state of the VM guest 50 to ON and the power OFF detection time to "nil", and sets the management VM host to have the key of the VM host 40 in the VM guest information 60B in the DB 60. Thereafter, the procedure returns to step 43.

According to the management server 30 having such a substitute processing function, the following processing will be performed when the life-cycle management function is not installed in the VM hosts 40.

When a VM guest 50 that is unlisted in the DB 60 and whose power-supply state is ON is acquired by a certain VM host 40, the record of the VM guest 50 is newly registered in the DB 60. Moreover, when a VM guest 50 that is listed in the DB 60 and whose power-supply state is ON is acquired by a certain VM host 40, the power-supply state of the VM guest 50 in the DB 60 is changed to ON. Here, if the VM host 40 is not the same as that indicated by the management VM host of the VM guest 50, the management VM host of the VM guest 50 in the DB 60 is changed to what indicates the VM host 40.

On the other hand, when a VM guest 50 whose power-supply state in the DB 60 is ON and whose power-supply state is OFF is acquired by a certain VM host 40, the power OFF detection time is set to the current time. Moreover, when a VM guest 50 whose power-supply state in the DB 60 is ON and whose power-supply state is OFF is acquired, if the power OFF detection time of the VM guest 50 is a time earlier than the update times at which the records of all the other VM hosts 40 were last updated, the power-supply state of the VM guest 50 is set to OFF and the power OFF detection time is set to "nil".

Briefly speaking, when the power-supply state of a third VM guest 50 acquired from a VM host 40 is ON and the third VM guest 50 is linked to another VM host 40, which is different from the VM host 40, in the DB 60, a link between the VM host 40 and the third VM guest 50 is generated in the DB 60. Moreover, when the power-supply state of a fourth VM guest 50 acquired from a VM host 40 is OFF and the power-supply state of the fourth VM guest 50 in the DB 60 is ON and when the power OFF detection time of the fourth VM guest 50 is a time earlier than times at which information was acquired from all the other VM hosts 40, which are different from the VM host 40, the power-supply state of the fourth VM guest 50 in the DB 60 is set to OFF.

Thus, even when VM hosts 40 in which no life-cycle management function is installed are used, which of the VM hosts 40 are currently managing and operating which of the VM guests 50, which are shared among the VM hosts 40, can be specified. Thus, it can be prevented that a plurality of VM hosts 40 start the same VM guest 50. For example, a disadvantage caused when a plurality of VM guests 50 update the same DB can be prevented.

According to the above-described embodiments, even operators other than the operator who migrated a VM guest on a physical server can determine whether the VM guest on the physical server disappears as a result of migration or deletion of the VM guest by investigating the content of the DB. Thus, the amount of effort required for an administrator to manage VMs can be reduced.

The embodiments can be implemented in computing hardware (computing apparatus) and/or software, such as (in a non-limiting example) any computer that can store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW. An example of communication media includes a carrier-wave signal. The media described above may be non-transitory media.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention(s) has(have) been described in detail, it should be understood that the various changes, substitutions, and alterations could be made hereto without departing from the spirit and scope of the invention.

What is claimed is:

1. A non-transitory recording medium storing a management program causing a management server that has a database to execute a processing, the processing comprising:

acquiring, from a plurality of virtual machine hosts, state information of a plurality of virtual machine guests managed by the virtual machine hosts, the state information including a power supply state of each virtual machine guest and an indication as to which of the virtual machine hosts each virtual machine guest is currently installed on;

updating link relation information indicating link relation between the virtual machine guests and the virtual machine hosts stored in the database, based on both of the acquired power-supply state and the installation indication of the virtual machine guests;

repeatedly executing the acquiring;

when it is determined from the link relation information that a specific virtual machine guest is not still installed on a previously indicated virtual machine host, waiting for a predetermined period of time and determining whether the specific virtual machine guest has been installed on another virtual machine host;

when the specific virtual machine guest has been installed on another virtual machine host within the predetermined time, updating the link relation information to reflect the link relation between the specific virtual machine guest and the another virtual machine host; and when the specific virtual machine guest has not been installed on another virtual machine host within the predetermined time, deleting the link relation information of the specific virtual machine quest.

2. The non-transitory recording medium according to claim 1, the processing further comprising:
deleting a part of the link relation information regarding a first virtual machine guest from the database when information regarding the first virtual machine guest cannot be acquired from all the virtual machine hosts after acquiring information indicating a power-supply state of the first virtual machine guest is off-state.

3. A method, comprising:
acquiring, from a plurality of virtual machine hosts, state information of a plurality of virtual machine guests managed by the virtual machine hosts, the state information including a power supply state of each virtual machine guest and an indication as to which of the machine hosts each virtual machine guest is installed on;
updating link relation information indicating link relation between the virtual machine guests and the virtual machine hosts stored in a database based on both of the acquired power-supply state and the installation indication of the virtual machine guests;
repeatedly executing the acquiring;
when it is determined from the link relation information that a specific virtual machine guest is not still installed on a previously indicated virtual machine host, waiting for a predetermined period of time and determining whether the specific virtual machine guest has been installed on another virtual machine host;
when the specific virtual machine guest has been installed on another virtual machine host within the predetermined time, updating the link relation information to reflect the link relation between the specific virtual machine guest and the another virtual machine host; and
when the specific virtual machine guest has not been installed on another virtual machine host within the predetermined time, deleting the link relation information of the specific virtual machine guest.

4. The method according to claim 3, further comprising deleting a part of the link relation information regarding a first virtual machine guest from the database when information regarding the first virtual machine guest cannot be acquired from all the virtual machine hosts after acquiring information indicating a power-supply state of the first virtual machine guest is off-state.

5. A system, comprising:
a storage configured to store a database in which link relation information indicating link relation between a plurality of virtual machine hosts and a plurality of virtual machine guests is stored; and
a computer configured to:
acquire, from the plurality of virtual machine hosts, state information of the plurality of virtual machine guests managed by the virtual machine hosts, the state information including a power supply state of each virtual machine guest and an indication as to which of the machine hosts each virtual machine guest is installed on;
update the link relation information stored in the database based on both of the acquired power-supply state and the installation indication of the virtual machine guests;
repeatedly execute the acquiring;
when it is determined from the link relation information that a specific virtual machine guest is not still installed on a previously indicated virtual machine host, wait for a predetermined period of time and determine whether the specific virtual machine guest has been installed on another virtual machine host;
when the specific virtual machine guest has been installed on another virtual machine host within the predetermined time, update the link relation information to reflect the link relation between the specific virtual machine quest and the another virtual machine host; and
when the specific virtual machine quest has not been installed on another virtual machine host within the predetermined time, delete the link relation information of the specific virtual machine quest.

6. The system according to claim 5, wherein the computer is further configured to:
delete a part of the link relation information regarding a first virtual machine guest from the database when information regarding the first virtual machine guest cannot be acquired from all the virtual machine hosts after acquiring information indicating a power-supply state of the first virtual machine guest is off-state.

* * * * *